United States Patent

Nicol et al.

[11] Patent Number: 5,804,619
[45] Date of Patent: Sep. 8, 1998

[54] ELASTOMER FUNCTIONALIZED BY GRAFTED CARBOXYL OR ESTER GROUPS AND ITS APPLICATION TO THE PRODUCTION OF FUNCTIONALIZED ELASTOMER/BITUMEN COMPOSITIONS WHICH CAN BE USED FOR THE PREPARATION OF COATINGS

[75] Inventors: Pascal Nicol, Pau; Jean-Pascal Planche, Saint Just Chaleyssin; Laurent Germanaud, Heyrieux; Hervé Nabet, Pau; Patrick Turello, Francheville, all of France

[73] Assignee: Elf Exploaration Production, Courbevoie, France

[21] Appl. No.: 849,905

[22] PCT Filed: Oct. 16, 1996

[86] PCT No.: PCT/FR96/01613

§ 371 Date: Aug. 22, 1997

§ 102(e) Date: Aug. 22, 1997

[87] PCT Pub. No.: WO97/14726

PCT Pub. Date: Apr. 24, 1997

[30] Foreign Application Priority Data

Oct. 19, 1995 [FR] France ................ 95 12275

[51] Int. Cl.$^6$ .......................... C08L 95/00; C08F 273/00
[52] U.S. Cl. ........................... 524/68; 525/289; 525/290; 525/291
[58] Field of Search .............. 524/68; 525/289, 525/290, 291

[56] References Cited

U.S. PATENT DOCUMENTS

| | | | |
|---|---|---|---|
| 4,145,379 | 3/1979 | Lundberg et al. | 525/289 |
| 4,578,428 | 3/1986 | Gergen et al. | 525/291 |
| 4,728,695 | 3/1988 | Brouwer et al. | 525/291 |
| 5,130,354 | 7/1992 | Gelles | 524/68 |
| 5,225,462 | 7/1993 | Mancini | 524/68 |
| 5,278,207 | 1/1994 | Kluttz | 524/68 |
| 5,322,867 | 6/1994 | Kluttz | 524/68 |
| 5,336,705 | 8/1994 | Gorbatz et al. | 524/68 |
| 5,348,994 | 9/1994 | Gorbatz et al. | 524/68 |

*Primary Examiner*—Peter A. Szekely
*Attorney, Agent, or Firm*—Burgess, Ryan & Wayne

[57] ABSTRACT

A functionalized elastomer is provided which is of the type containing a substrate elastomer, having a weight-average molecular mass $(\bar{M}w)_0$ of between 10,000 and 600,000 daltons and a polydispersity index of less than 5, onto which are grafted, in an amount representing 0.1 to 10% by weight of the substrate, sequences carrying carboxyl or ester functional groups, wherein its weight-average molecular $\bar{M}w$ is such that the ratio $$\frac{|\bar{M}w - (\bar{M}w)_0|}{(\bar{M}w)_0}$$

is less than 20% and the sequences grafted onto the substrate correspond to the formula $$-S-R_1-(COOX)_x,$$
$$|$$
$$(SH)_z$$

in which $R_1$ denotes an $(x+z+1)$-valent $C_1$ to $C_{12}$ hydrocarbon radical, X represents H or a monovalent $C_1$ to $C_{12}$ hydrocarbon radical R, z is equal to zero or 1 and x is an integer having a value ranging from 1 to 3 with $x+z \leq 3$. Bitumen/EF compositions useful for making surfacings may be produced by incorporating the EF into a bituminous component.

29 Claims, No Drawings

ELASTOMER FUNCTIONALIZED BY GRAFTED CARBOXYL OR ESTER GROUPS AND ITS APPLICATION TO THE PRODUCTION OF FUNCTIONALIZED ELASTOMER/BITUMEN COMPOSITIONS WHICH CAN BE USED FOR THE PREPARATION OF COATINGS

BACKGROUND OF THE INVENTION

1) Field of the Invention

The invention relates to an elastomer functionalized by carboxyl or ester groups which are carried by grafted sequences of controlled length. It also relates to the application of this functionalized elastomer to the production of functionalized elastomer/bitumen compositions which can be used as coatings and in particular as road surfacings, as bituminous mixes or alternatively as watertight facings.

2) Background Art

Functionalized elastomer/bitumen compositions are known which are composed of a mixture of one or a number of bitumens, of a functionalized elastomer carrying carboxylic acid or derived functional groups, for example carboxylic acid esters or anhydrides, and optionally of a salifying agent capable of reacting with the functional groups of the functionalized elastomer and thus of resulting in the formation of bridgings between the macromolecular chains of the functionalized elastomer (U.S. Pat. Nos. 5,189,083, 5,214,082, 5,278,207 and EP-A-0,548,412).

The functionalized elastomer can be composed of a block copolymer of styrene and of a conjugated diene, such as butadiene or isoprene, which additionally contains at least one block deriving from an acrylic monomer capable of providing carboxylic acid functional groups by hydrolysis (U.S. Pat. Nos. 5,189,083, 5,214,082 and 5,278,207), or alternatively it can be composed of a block copolymer of styrene and of a conjugated diene, such as butadiene or isoprene, carrying grafted chains containing carboxylic acid or carboxylic anhydride functional groups (U.S. Pat. No. 5,278,207 and EP-A-0,548,412).

The salifying agent can be chosen from amines, quaternary ammonium salts, metal oxides and hydroxides, alkali metal or alkaline-earth metal carbonates, metal carboxylates, alcohols, aminoalcohols and epoxides (EP-A-0,548,412). In particular, the salifying agent can be taken from polyfunctional amines having at least two amino functional groups (U.S. Pat. No. 5,278,207).

The elastomers functionalized by carboxylic acid or derived groups used to produce the functionalized elastomer/bitumen compositions of the abovementioned citations only possess to a limited extent carboxyl or derived functional groups attached along the macromolecular chains of the elastomer and capable of inducing crosslinkings or bridgings of the said chains with one another and/or with the bitumen, directly or after addition of the salifying agent. For this reason, the physicomechanical characteristics of the functionalized elastomer/bitumen compositions obtained, in particular plasticity range (difference between the ring-and-ball softening temperature and the Fraass brittleness point) and mechanical characteristics at low temperatures of use, are not entirely satisfactory.

SUMMARY OF THE INVENTION

According to the invention, an elastomer functionalized by grafted carboxyl or ester functional groups is provided, which elastomer exhibits a polydispersity index very similar to that of the corresponding non-functionalized elastomer and an improved distribution of the functional groups along the macromolecular chains of the elastomer, which makes it possible, during the use of such a functionalized elastomer in the preparation of functionalized elastomer/bitumen compositions, to obtain functionalized elastomer/bitumen compositions which exhibit an expanded plasticity range as well as improved tensile mechanical characteristics.

The functionalized elastomer according to the invention is of the type containing a substrate elastomer, having a weight-average molecular weight $(\overline{M}w)_0$ of between 10,000 and 600,000 daltons and a polydispersity index $PI_0$ of less than 5, onto which are grafted, in an amount representing 0.1 to 10% by weight of the substrate, sequences carrying carboxyl or ester functional groups and it is characterized in that its weight-average molecular weight $\overline{M}w$ is such that the ratio $$\frac{|\overline{M}w - (\overline{M}w)_0|}{(\overline{M}w)_0}$$

is less than 20% and preferably less than 12% and in that the sequences grafted onto the substrate correspond to the formula

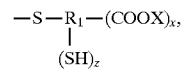

in which $R_1$ denotes an $(x+z+1)$-valent $C_1$ to $C_{12}$, preferably $C_1$ to $C_8$, hydrocarbon radical, X represents H or a $C_1$ to $C_{12}$ and preferably $C_1$ to $C_8$ monovalent hydrocarbon radical R, z is equal to zero or 1 and x is an integer having a value ranging from 1 to 3 and preferably equal to 1 or 2, with $x+z \leq 3$.

The sequences grafted onto the elastomer substrate advantageously correspond to the formula —S—$R_3$—(COOX)$_x$, where X and x have the abovementioned meanings and $R_3$ denotes an $(x+1)$-valent $C_1$ to $C_{12}$ and preferably $C_1$ to $C_8$ hydrocarbon radical, the said sequences having in particular the formula —S—$R_3$—(COOH)$_x$.

DESCRIPTION OF THE PREFERRED EMBODIMENTS

In the abovementioned formulae of the sequences grafted onto the elastomer substrate, the $(x+z+1)$-valent hydrocarbon radical $R_1$, the $(x+1)$-valent radical $R_3$ and the monovalent hydrocarbon radical R can each represent a saturated, linear or branched, $C_1$ to $C_{12}$, preferably $C_1$ to $C_8$, aliphatic radical, an unsaturated, linear or branched, $C_2$ to $C_{12}$, preferably $C_2$ to $C_8$, aliphatic radical, a $C_4$ to $C_{12}$, preferably $C_6$ to $C_8$, cycloaliphatic radical or a $C_6$ to $C_{12}$, preferably $C_6$ to $C_8$, aromatic radical. The radical R is preferably a linear or branched, $C_1$ to $C_{12}$ and more especially $C_1$ to $C_8$ alkyl radical, such as, for example, methyl, ethyl, propyl, butyl, isooctyl, 2-ethylhexyl or n-octyl.

Mention may be made, as examples of sequences corresponding to the formulae given above which can be grafted onto the elastomeric substrate in order to form a functionalized elastomer according to the invention, of sequences for which, in the abovementioned formulae, X is a hydrogen atom, in particular —S—$CH_2$—COOH, —S—$CH_2$—$CH_2$—COOH, —S—$CH_2$—$CH_2$—$CH_2$—COOH,

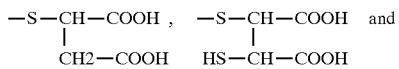
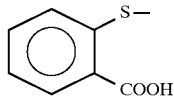

and the corresponding sequences for which the —COOH group is replaced by an ester group —COOR', where R' is a $C_1$ to $C_{12}$ and in particular $C_1$ to $C_8$ alkyl, such as, for example, methyl, ethyl, propyl, butyl, 2-ethylhexyl, n-octyl or isooctyl.

The elastomer which forms the substrate of the functionalized elastomer according to the invention can be, for example, polyisoprene, polynorbornene, polybutadiene, butyl rubber, ethylene/propylene (EP) random copolymer or ethylene/propylene/diene (EPDM) random terpolymer. The said elastomer is advantageously chosen from random or block copolymers of styrene and of a conjugated diene, in particular butadiene, isoprene, chloroprene, carboxylated butadiene or carboxylated isoprene, and more particularly is composed of one or a number of copolymers chosen from block copolymers, with or without a random hinge, of styrene and of butadiene, of styrene and of isoprene, of styrene and of chloroprene, of styrene and of carboxylated butadiene or alternatively of styrene and of carboxylated isoprene. The copolymer of styrene and of conjugated diene, and in particular each of the abovementioned copolymers, advantageously has a styrene content by weight ranging from 5% to 50%.

The mass-average molecular mass $(\overline{Mw})_0$ of the substrate elastomer and in particular that of the polymer of styrene and of conjugated diene and very particularly that of the abovementioned copolymers is between 10,000 and 600,000 daltons and preferably lies between 30,000 and 400,000 daltons.

The polydispersity index of the substrate elastomer $PI_0$, that is to say the ratio of the weight-average molecular weight $(\overline{Mw})_0$ of the said substrate to its number-average molecular weight $(\overline{Mn})_0$, is, as indicated above, less than 5 and preferably lies between 1 and 3.

The substrate elastomer of the functionalized elastomer according to the invention is preferably composed of a copolymer of styrene and of conjugated diene chosen from di- or triblock copolymers, with or without a random hinge, of styrene and of butadiene, of styrene and of isoprene, of styrene and of carboxylated butadiene or alternatively of styrene and of carboxylated isoprene which have styrene contents by weight, weight-average molecular weight $(\overline{Mw})_0$ and poly-dispersity index $PI_0$ values lying within the ranges defined above.

The functionalized elastomer according to the invention advantageously contains a proportion of grafted sequences representing 0.1 to 6% and preferably 0.3 to 3% by weight of the substrate elastomer.

The functionalized elastomer provided by the invention is advantageously obtained by a grafting technique which consists in bringing (i) a substrate elastomer as defined above, having a weight-average molecular weight $(\overline{Mw})_0$ of between 10,000 and 600,000 daltons and more particularly between 30,000 and 400,000 daltons and a polydispersity index of less than 5 and preferably of between 1 and 3, into contact with (ii) a precursor of the sequences containing carboxyl or ester functionality, composed of at least one compound of formula

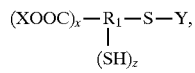

in which Y denotes a hydrogen atom or a monovalent residue

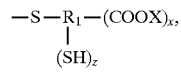

each of the symbols X, $R_1$, z and x having the meaning given above, until the functionalized elastomer has been formed, the amount of precursor representing 0.5% to 25% and preferably 1% to 15% of the weight of the substrate elastomer, the said operation of bringing the elastomer into contact with the precursor being carried out in bulk or in a solvent and/or diluent medium, at temperatures of between 40° C. and 250° C. and in the presence of 0.1% to 1.5% and preferably of 0.1% to 1%, by weight of the substrate elastomer, of a blocked phenol and of 0% to 2% and preferably of 0% to 1.5%, by weight of the substrate elastomer, of a tri(dialkylphenyl) phosphite.

The precursor of the grafted sequences is advantageously composed of at least one compound having the formula $Y_1$—S—$R_3$—$(COOX)_x$, where $Y_1$ denotes H or a monovalent residue —S—$R_3$—$(COOX)_x$, and in particular the formula $Y_2$—S—$R_3$—$(COOH)_x$, where $Y_2$ represents H or a monovalent residue —S—$R_3$—$(COOH)_x$, the symbols $R_3$, X and x each having the meaning given above.

The presence of the blocked phenol alone or of the blocked phenol/tri(dialkylphenyl) phosphite combination in the grafting reaction mixture prevents the substrate elastomer from crosslinking during the grafting operation. When the grafting reaction mixture contains both a blocked phenol and a tri(dialkylphenyl) phosphite, the amount by weight of triphosphite is preferably at least equal to and more especially greater than that of the blocked phenol.

The blocked phenol is advantageously chosen from compounds corresponding to the formula

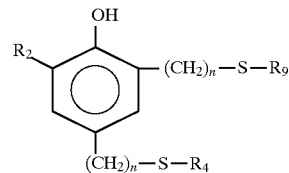

in which the symbols $R_2$, $R_9$ and $R_4$, which are identical or different, represent monovalent $C_1$ to $C_{18}$ and more particularly $C_1$ to $C_{12}$ aliphatic hydrocarbon radicals, very especially methyl and t-butyl for $R_2$ and hexyl, heptyl, nonyl and very particularly octyl for $R_9$ and $R_4$, and n is a number from 0 to 5. As regards the tri(dialklylphenyl) phosphate, it is more particularly chosen from compounds corresponding to the formula

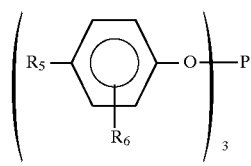

in which the symbols $R_5$ and $R_6$, which are identical or different, represent R or monovalent $C_1$ to $C_{18}$ and more particularly $C_1$ to $C_{12}$ aliphatic hydrocarbon radicals, very especially H, isopropyl or t-butyl for $R_5$ and H, t-butyl, hexyl, heptyl, octyl or nonyl for $R_6$.

If need be, in order to facilitate the attachment, onto the substrate elastomer, of the sequences to be grafted, generated by the precursor compound of these sequences, it is possible to add a radical initiator to the grafting reaction mixture which generates free radicals at the temperatures, between 40° C. and 250° C., chosen for the grafting, which radical initiator is in particular a peroxide compound and, for example, a dihydrocarbyl peroxide, such as lauroyl peroxide, benzoyl peroxide, dicumyl peroxide or alternatively di-tert-butyl peroxide. The amount of radical initiator can vary fairly widely and can represent, for example, 0.01% to 6% and more particularly 0.05% to 3% by weight of the substrate elastomer.

As indicated above, the grafting can be carried out in bulk, that is to say in the absence of any solvent or diluent, or, in contrast, in a solvent and/or diluent medium. The substrate elastomer can thus advantageously represent 10% to 100% and preferably 15% to 100% of the overall weight of substrate elastomer and of solvent and/or diluent medium. The said solvent and/or diluent medium in which the grafting reaction can be carried out can be composed of any liquid which is without effect on the components participating in the grafting reaction and it can be chosen, for example, from hydrocarbons, in particular aromatic hydrocarbons, such as ethylbenzene, which are liquid at the temperatures chosen for the grafting.

The duration of the grafting reaction can vary from a few minutes, for example 5 to 10 minutes, to several hours, for example 4 to 5 hours.

When the grafting reaction is carried out in a solvent and/or diluent medium, the functionalized elastomer resulting from the grafting is separated from the said medium by any technique known for this purpose and, for example, by a technique which comprises diluting the reaction mixture resulting from the grafting, followed by precipitating the diluted mixture from a precipitating liquid, such as acetone.

Advantageously, when the precursor of the grafted sequences is a thiol compound having the formula

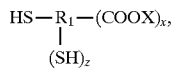

more particularly the formula HS—$R_3$—$(COOX)_x$ and in particular the formula HS—$R_3$—$(COOH)_x$, the grafting reaction is implemented at temperatures of between 40° C. and 150° C. in a solvent and/or diluent medium or in bulk. When the precursor of the grafted sequences is a disulphide compound having the formula

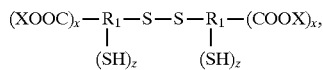

more particularly the formula $(XOOC)_x$—$R_3$—S—S—$R_3$ $(COOX)_x$ and in particular the formula $(HOOC)_x$—$R_3$—S—S—$R_3$—$(COOH)_x$, it is preferable to implement the grafting reaction in bulk at temperatures of between 150° C. and 250° C. and very particularly in the absence of radical initiator.

Mention may be made, as examples of precursor compounds of the grafted sequences, of:

(i) thiol compounds, such as thiolacetic acid (thioglycolic acid) of formula HS—$CH_2$—COOH, thiolpropionic acid of formula HS—$CH_2$—$CH_2$—COOH, thiolbutanoic acid of formula HS—$CH_2$—$CH_2$—$CH_2$—COOH, mercaptosuccinic acid of formula

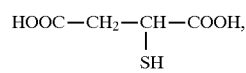

dimercaptosuccinic acid of formula

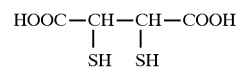

or thiosalicylic acid of formula

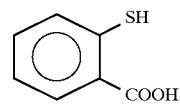

(ii) disulphide compounds, such as 2,2'-dithiodiacetic acid of formula HOOC—$CH_2$—S—S—$CH_2$—COOH, 3,3'-dithiodipropionic acid of formula HOOC—$CH_2$—$CH_2$—S—S—$CH_2$—$CH_2$—COOH, 4,4'-dithiodibutanoic acid of formula HOOC—$(CH_2)_3$—S—S—$(CH_2)_3$—COOH and 2,2'-dithiodisalicylic acid of formula

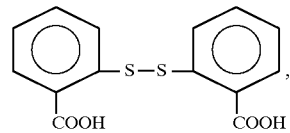

and (iii) esters deriving from the said acids exemplified above by replacement of the —COOH functional groups by ester functional groups —COOR', where R' is a $C_1$ to $C_{12}$ and more particularly $C_1$ to $C_8$ alkyl radical, such as, for example, methyl, ethyl, propyl, butyl, 2-ethylhexyl, n-octyl or isooctyl.

The functionalized elastomer according to the invention can be very particularly used for the production of functionalized elastomer/bitumen compositions with a wide plasticity range by incorporation, in a bituminous component, of an amount of the said functionalized elastomer representing 0.5% to 25% and more especially 1% to 15% of the weight of the bituminous component.

The bituminous component which is used to form the functionalized elastomer/bitumen composition can be composed of one or a number of bitumens which have a kinematic viscosity at 100° C. of between $0.5 \times 10^{-4}$ m$^2$/s and $3 \times 10^{-2}$ m$^2$/s and preferably between $1 \times 10^{-4}$ m$^2$/s and $2 \times 10^{-2}$ m$^2$/s. These bitumens may be direct distillation or vacuum distillation bitumens or else blown or semiblown bitumens, propane or pentane deasphalting residues, indeed even some petroleum cuts or mixtures of bitumens and of vacuum distillates or alternatively mixtures of at least two of the products which have just been listed. Besides a kinematic viscosity included within the abovementioned ranges, the bituminous component which forms part of the formulation of the functionalized elastomer/bitumen composition advantageously has a penetrability at 25° C., defined according to NF Standard T 66004, of between 5 and 800 and preferably between 10 and 400.

The incorporation of the functionalized elastomer in the bituminous component is carried out by kneading the ingredients, the operation being carried out at temperatures of between 100° C. and 230° C. and more particularly between 120° C. and 190° C., for a sufficient period of time, generally of the order of a few tens of minutes to a few hours and, for example, of the order of 30 minutes to 8 hours, in order to form a homogeneous mixture, which mixture constitutes the functionalized elastomer/bitumen composition.

The said mixture can advantageously have added to it, the operation being carried out with stirring at temperatures of between 100° C. and 230° C. and more particularly between 120° C. and 190° C., one or a number of additives capable of reacting with the carboxyl functional groups carried by the functionalized elastomer, in order to activate or reinforce the crosslinking of the macro-molecular chains of the elastomer with one another and/or with the bituminous component and thus to reinforce the physicomechanical characteristics of the functionalized elastomer/bitumen composition. According to the invention, it is also possible to react the functionalized elastomer first of all with the reactive additive or the reactive additives and then to incorporate the reaction product obtained in the bituminous component. These reactive additives may be, in particular, primary or secondary amines, especially polyamines, alcohols, aminoalcohols, epoxides or alternatively metal compounds.

Reactive additives of the amine type are, for example, aromatic diamines such as 1,4-diaminobenzene, 2,4-diaminotoluene, diaminonaphthalene, bis(4-aminophenyl) sulphone, bis(4-aminophenyl) ether, bis(4-aminophenyl) methane, aliphatic or cycloaliphatic diamines such as those of formula $H_2N-R_7-NH_2$ where $R_7$ denotes a $C_2$ to $C_{12}$ alkylene or $C_6$ to $C_{12}$ cycloalkylene radical, for example ethylenediamine, diaminopropane, diaminobutane, diaminohexane, diaminooctane, diaminodecane, diaminododecane, diaminocyclohexane, diaminocyclooctane, diaminocyclododecane, polyethylenepolyamines or polypropylenepolyamines such as diethylenetriamine, triethylenetetramine, tetraethylenepentamine or dipropylenetriamine or else fatty amines or polyamines, that is to say amines or polyamines containing a $C_{12}$ to $C_{18}$ alkyl or alkenyl radical bonded to the nitrogen atom of an amine group.

Reactive additives of the alcohol type are, in particular, polyols such as diols or triols and especially diols of formula $HO-R_8-OH$, where $R_8$ denotes a hydrocarbon radical, especially a $C_2$ to $C_{18}$ alkylene, $C_6$ to $C_8$ arylene and $C_6$ to $C_8$ cycloalkylene radical, and polyetherdiols of formula $HO-[C_qH_{2q}O]_r-H$ where q is a number ranging from 2 to 6 and especially equal to 2 or 3 and r is a number at least equal to 2 and ranging, for example, from 2 to 20. Examples of such polyols are such as ethylene glycol, propylene glycol, butylene glycol, diethylene glycol, triethylene glycol, tetraethylene glycol, hexanediol, octanediol and polyhydroxylated polybutadiene.

Reactive additives of the metal compound type are, in particular, compounds such as hydroxides, oxides, alcoholates, carboxylates like formates and acetates, methoxides, ethoxides, nitrites, carbonates and bicarbonates of metals of groups I, II, III and VIII of the Periodic Table of the Elements, especially Na, K, Li, Mg, Ca, Cd, Zn, Ba, Al and Fe.

The amount of the reactive additive or of the reactive additives which is incorporated in the functionalized elastomer/bitumen composition can range from 0.01% to 10% and more particularly from 0.05% to 5% of the weight of the bituminous component present in the said composition. The said amount is advantageously between one and four times the stoichiometric amount corresponding to complete reaction of the reactive additive or of the reactive additives with the functional groups carried by the functionalized elastomer.

During production or after having been produced, the functionalized elastomer/bitumen composition may further have added to it, the operation being carried out with stirring at temperatures of between 100° C. and 230° C. and more particularly between 120° C. and 190° C., 1% to 40% and more especially 2% to 30%, by weight of the bituminous component, of a fluxing agent which may be composed, in particular, of a hydrocarbon oil which has an atmospheric pressure distillation range, determined according to ASTM Standard D 86-67, of between 100° C. and 600° C. and lying more particularly between 150° C. and 400° C. This hydrocarbon oil, which may be especially a petroleum cut of aromatic nature, a petroleum cut of naphtheno-aromatic nature, a petroleum cut of naphtheno-paraffinic nature, a petroleum cut of paraffinic nature, a coal oil or else a vegetable oil, is sufficiently "heavy" to limit the evaporation at the time of its addition to the bituminous component and, at the same time, sufficiently "light" to be removed as much as possible after the functionalized elastomer/bitumen composition containing it has been spread, so as to regain the same mechanical properties which the functionalized elastomer/bitumen composition prepared without employing any fluxing agent would have exhibited after hot spreading. The amount of fluxing agent is chosen within the range as defined above, in order to be compatible with the desired final use on the work site.

Besides the reactive additives and the fluxing agent, it is also possible to incorporate in the functionalized elastomer/bitumen composition, during the production of the said composition or after it has been produced, additives which are conventionally employed in compositions based on a bituminous component and on polymers, such as promoters of adhesion of the functionalized elastomer/bitumen composition to the mineral surfaces or else fillers such as talc, carbon black or worn tyres reduced to fine powder.

In one embodiment employing a hydrocarbon oil as defined above as fluxing agent incorporated in the functionalized elastomer/bitumen composition, the functionalized elastomer is incorporated in the bituminous component in the form of a mother solution in the hydrocarbon oil constituting the fluxing agent.

The mother solution is prepared by bringing into contact the ingredients of which it is composed, namely hydrocarbon oil acting as solvent and functionalized elastomer, with stirring, at temperatures of between 10° C. and 170° C. and more particularly between 40° C. and 120° C., for a sufficient period of time, for example from approximately 30 minutes to approximately 90 minutes, to obtain complete dissolution of the functionalized elastomer.

The concentration of the functionalized elastomer in the mother solution may vary quite widely, especially as a function of the nature of the hydrocarbon oil employed for dissolving the functionalized elastomer. Thus, the amount of functionalized elastomer can represent, in particular, 5 to 40% and more particularly 10 to 30% of the weight of the hydrocarbon oil.

To prepare the functionalized elastomer/bitumen composition by making use of the mother solution technique, the mother solution containing the functionalized elastomer is mixed with the bituminous component, the operation being carried out at temperatures of between 100° C. and 230° C., more particularly between 120° C. and 190° C., and with stirring, until a homogeneous mass is obtained. The duration of mixing can range, for example, from 10 minutes to 90 minutes. The amount of the mother solution which is mixed with the bituminous component is chosen to yield the desired amount of functionalized elastomer with respect to the said bituminous component, this amount lying within the ranges defined above.

The functionalized elastomer/bitumen compositions obtained according to the invention may be employed as they are or else diluted with variable proportions of a bitumen or mixture of bitumens or of a composition according to the invention which has different characteristics, in order to form functionalized elastomer/bitumen binders which have chosen contents of functionalized elastomer. These contents may be either equal to (undiluted compositions) the functionalized elastomer contents of the corresponding initial functionalized elastomer/bitumen compositions or different (diluted compositions) from these latter contents. The dilution of the functionalized elastomer/bitumen compositions according to the invention with a bitumen or mixture of bitumens or with a composition according to the invention of different characteristics may be carried out either directly following the production of the said compositions, when a virtually immediate use of the resulting functionalized elastomer/bitumen binders is required, or else alternatively after a more or less extended period of storage of the functionalized elastomer/bitumen compositions, when a delayed use of the resulting functionalized elastomer/bitumen binders is envisaged. The bitumen or mixture of bitumens employed for the dilution of a functionalized elastomer/bitumen composition according to the invention may be chosen from the bitumens defined above as being suitable for the production of the functionalized elastomer/bitumen compositions.

The dilution of a functionalized elastomer/bitumen composition according to the invention with a bitumen or mixture of bitumens or with a second composition according to the invention with a lower content of functionalized elastomer, in order to form a functionalized elastomer/bitumen binder with a chosen content of functionalized elastomer which is lower than that in the functionalized elastomer/bitumen composition to be diluted, is generally carried out by bringing into contact, with stirring and at temperatures of between 100° C. and 230° C. and more particularly between 120° C. and 190° C., appropriate proportions of the functionalized elastomer/bitumen composition to be diluted and of bitumen or mixture of bitumens or of second functionalized elastomer/bitumen composition.

The functionalized elastomer/bitumen binders consisting of the functionalized elastomer/bitumen compositions according to the invention or resulting from the dilution of the said compositions with a bitumen or mixture of bitumens or with another functionalized elastomer/bitumen composition according to the invention, as far as the desired content of functionalized elastomer in the said binders, can be applied, directly or after conversion into aqueous emulsion, to the production of road surfacings of the surface coating type, to the production of bituminous mixes which are put in place with heating or cold, or else to the production of watertight facings.

The invention is illustrated by the following examples, given without any limitation being implied.

In these examples, the amounts and percentages are expressed by weight, except when otherwise indicated.

In addition, the Theological and mechanical characteristics of the bituminous components or of the functionalized elastomer/bitumen compositions to which reference is made in some of the said examples are as follows:

penetrability, expressed in 1/10 of an mm and determined according to NF Standard T 66004, ring-and-ball softening temperature, expressed in °C and determined by the ring-and-ball test defined by NF Standard T 66008, tensile Theological characteristics, determined according to NF Standard T 46002 and comprising the quantities:

elongation at break $\epsilon_b$, in %, breaking stress $\sigma_b$, in daN/cm$^2$, Pfeiffer's number (abbreviated to PN), calculated from the relationship $$PN = \frac{20 - 500A}{1 + 50A} \quad \text{with} \; A = \frac{\log_{10} 800 - \log_{10} pen}{RBT - 25}$$

where "pen" and "RBT" respectively denote the penetrability and the ring-and-ball temperature as defined above, this number providing an indication of the temperature susceptibility of the composition.

EXAMPLE 1

Synthesis of a Styrene/butadiene Diblock Elastomer Containing Grafted Carboxyl Functionality Introduced by Grafting Thiolacetic Acid, which is Carried Out in Solution The synthesis is carried out in a three-litre stainless steel reactor equipped with a ribbon stirrer and with means for controlling the temperature.

281 parts of an elastomer composed of a styrene/butadiene diblock block copolymer in solution in 1125 parts of ethylbenzene were introduced, at 20° C., into the reactor maintained under a nitrogen atmosphere, the said copolymer containing 25% of styrene and having a weight-average molecular weight $(\overline{M}w)_0$ of 144,000.

17.9 parts of thiolacetic acid (HS—CH$_2$—COOH) were then added to the contents of the reactor, followed by 1.4 parts of a blocked phenol of formula

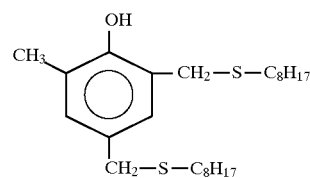

product sold by CIBA under the name Irganox 1520) and 1.7 parts of the triphosphite of formula

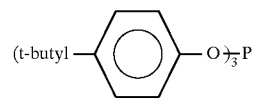

(product sold by CIBA under the name Irgafos 168).

The charge in the reactor was then brought to 92° C. with stirring (200 revolutions/minute) and under a nitrogen pressure of 2 bars, after which 6 parts of a 10% solution of benzoyl peroxide in toluene were added to it, followed, after one hour, by another three parts of the said solution.

After the second addition of benzoyl peroxide, the contents of the reactor were maintained at a temperature of 92° C. for a further three hours.

At the end of this period, the reaction mixture was cooled and the grafted product was then recovered by evaporation under vacuum of the said cooled reaction mixture.

A grafted elastomer was obtained which comprises a styrene/butadiene diblock block copolymer containing 25% of styrene and carrying —S—CH$_2$—COOH grafted sequences in an amount, determined by infrared spectroscopy, representing 0.92% of the diblock block copolymer. The weight-average molecular weight $\overline{M}w$ of the said grafted elastomer was 138,000

$$(\frac{|\overline{Mw} - (\overline{Mw})_o|}{(\overline{Mw})_o}$$

ratio of 4.2%) and its gel content was less than 1%, which testifies to a very slight degradation during grafting.

EXAMPLE 2
Synthesis of a Styrene/butadiene Diblock Elastomer Containing Grafted Carboxyl Functionality Introduced by Grafting Thiolpropionic Acid, which is Carried Out in Solution The synthesis is carried out as described in Example 1, thiolacetic acid being replaced, however, by 20.6 parts of thiolpropionic acid (HS—CH$_2$—CH$_2$—COOH).

A grafted elastomer was obtained which is composed of a styrene/butadiene diblock block copolymer containing 25% of styrene and carrying —S—CH$_2$—CH$_2$—COOH grafted sequences in an amount, determined by infrared spectroscopy, representing 1.1% of the diblock block copolymer. The weight-average molecular weight $\overline{M}w$ of the said grafted elastomer was 139,000

$$(\frac{|\overline{Mw} - (\overline{Mw})_o|}{(\overline{Mw})_o}$$

ratio of 3.5%) and its gel content was less than 1%.

EXAMPLE 3
Synthesis of a Styrene/butadiene Diblock Elastomer Containing Grafted Carboxyl Functionality Introduced by Grafting Dithiodipropionic Acid, which is Carried Out in Bulk The synthesis was carried out in a multiple-rotor kneading vessel of the Bradender type (Rheomix 600) maintained at 180° C. and under a nitrogen atmosphere throughout the duration of the operations.

50 parts of an elastomer composed of a diblock block copolymer identical to that used in Examples 1 and 2 were introduced into the kneading vessel, the said block copolymer being protected against oxidation with 0.25 part of the blocked phenol Irganox 1520 and 0.3 part of the triphosphite Irgafos 168. A kneading speed corresponding to a rate of rotation of the rotors of this vessel of 32 revolutions/minute was then applied to the mass present in the vessel, 1.5 parts of dithiodipropionic acid (HOOC—CH$_2$—CH$_2$—S—S—CH$_2$—CH$_2$—COOH) were added to the said mass and then the contents of the vessel were kneaded for 30 minutes at 180° C.

At the end of this period, the grafted polymer was extracted from the kneading vessel and then cooled.

A grafted elastomer was obtained which is composed of a styrene/butadiene diblock block copolymer containing 25% of styrene and carrying —S—CH$_2$—CH$_2$—COOH grafted sequences in an amount, determined by infrared spectroscopy, representing 0.45% of the diblock block copolymer. The weight-average molecular weight $\overline{M}w$ of the said grafted elastomer was 154,500

$$(\frac{|\overline{Mw} - (\overline{Mw})_o|}{(\overline{Mw})_o}$$

ratio of 7.3%). The said grafted elastomer had excellent solubility in the usual solvents, for example ethylbenzene, the solution obtained being free from gels.

EXAMPLE 4
Synthesis of a Styrene/butadiene Diblock Elastomer Containing Grafted Carboxyl Functionality Introduced by Grafting Dithiodiprorionic Acid, which is Carried Out in Bulk The synthesis was carried out as described in Example 3, with, moreover, addition of an additional amount of dithiodipropionic acid in the kneading vessel, 15 minutes after having introduced the first amount, the said additional amount also being 1.5 parts.

A grafted elastomer was obtained which is composed of a styrene/butadiene diblock block copolymer containing 25% of styrene and carrying —S—CH$_2$—CH$_2$—COOH grafted sequences in an amount, determined by infrared spectroscopy, representing 0.89% of the diblock block copolymer. The weight-average molecular weight $\overline{M}w$ of the said grafted elastomer was 159,000

$$(\frac{|\overline{Mw} - (\overline{Mw})_o|}{(\overline{Mw})_o}$$

ratio of 10.4%). The said grafted elastomer had excellent solubility in the usual solvents, for example ethylbenzene, the solution obtained being free from gels.

EXAMPLE 5
A Control Elastomer/bitumen Composition (Test 5.A) and Functionalized Elastomer/bitumen Compositions According to the Invention (Tests 5.B to 5.F) Were Prepared, in Order to Evaluate and Compare the Physicomechanical Characteristics Thereof.

The preparations were carried out under the following conditions:

Test 5.A (control)
Preparation of a Non-functionalized Elastomer/bitumen Composition 965 parts of a bitumen having a penetrability at 25° C., determined according to the conditions of NF Standard T 66004, of 63 and 35 parts of a diblock block copolymer of styrene and of butadiene as elastomer were introduced into a reactor maintained at 180° C. and with stirring, the said copolymer having a weight-average molecular weight $\overline{M}w$ of 144,000 daltons and containing 25% of styrene. After mixing for three hours with stirring at 180° C., a homogeneous mass was obtained constituting the non-functionalized elastomer/bitumen composition.

Test 5.B (According to the Invention)
Preparation of a Functionalized Elastomer/bitumen Composition (Grafted Functional Sequence: —S—CH$_2$—COOH)

940 parts of a bitumen having a penetrability at 25° C., determined according to the conditions of NF Standard T 66004, of 88 and 60 parts of an elastomer containing grafted carboxyl functionality composed of the grafted copolymer obtained as described in Example 1 were introduced into a reactor maintained at 180° C. and with stirring. After mixing for six hours with stirring at 180° C., a homogeneous mass was obtained constituting the functionalized elastomer/bitumen composition. This composition contained 6.4% of functionalized elastomer with respect to the bituminous component employed.

Test 5.C (According to the Invention)
Preparation of a Dilute Functionalized Elastomer/bitumen Composition (Grafted Functional Sequence: —S—CH$_2$—COOH)

A functionalized elastomer/bitumen composition with a high content of functionalized elastomer was prepared, the operation being carried out as described in Test 5.B.

The functionalized elastomer/bitumen composition thus obtained was then diluted with the same bitumen as that employed in Example 5.B to a final content of 3.5% of functionalized elastomer in the dilute composition. The dilution operation was carried out at 180° C. and with stirring for a period of time of four hours.

Test 5.D (According to the Invention)
Preparation of a Dilute Functionalized Elastomer/bitumen Composition (Grafted Functional Sequence: —S—CH$_2$—COOH) Neutralized with a Reactive Additive of the Polyamine Type A dilute functionalized elastomer/bitumen composition was prepared by carrying out the operation as described in Test 5.C.

1.1 parts of a fatty amine, namely N-tallow-3-amino-1-propyltetrahydropyrimidine, sold by the company CECA under the name Polyram L200®, were added to the dilute composition obtained, maintained with stirring at 180° C., and then the whole mixture was maintained with stirring at 180° C. for three hours in order to enable the amine to neutralize the carboxyl functional groups of the functionalized elastomer present in the composition.

Test 5.E (According to the Invention)
Preparation of a Functionalized Elastomer/bitumen Composition (Grafted Functional Sequence: —S—CH$_2$—CH$_2$—COOH)

The operation was carried out as described in Test 5.C, the functionalized elastomer containing —S—CH$_2$—COOH grafted sequences being replaced, however, by the same amount by weight of the elastomer containing —S—CH$_2$—CH$_2$—COOH grafted sequences obtained as described in Example 4.

Test 5.F (according to the invention)
Preparation of a Functionalized Elastomer/bitumen Composition (Grafted Functional Sequence: —S—CH$_2$—CH$_2$—COOH) Neutralized with a Reactive Additive of the Polyamine Type A functionalized elastomer/bitumen composition was prepared by carrying out the operation as described in Test 5.E.

0.64 part of the fatty amine Polyram L200® was incorporated in the composition thus obtained, the operation being carried out as indicated in Test 5.D, in order to neutralize the carboxyl functional groups of the functionalized elastomer present in the composition.

The following characteristics were determined for the control elastomer/bitumen composition of Test 5.A and for the functionalized elastomer/bitumen compositions obtained according to the invention, namely functionalized elastomer/bitumen concentrated composition produced in Test 5.B and functionalized elastomer/bitumen dilute compositions produced in Tests 5.C to 5.F:

penetrability at 25° C. (Pen. 25), ring-and-ball softening temperature (RBT),

Pfeiffer's number (PN), tensile Theological characteristics, namely:

breaking stress ($\sigma_b$)

elongation at break ($\epsilon_b$).

The results obtained are presented in the table given below:

TABLE

| Test | 5.A | 5.B | 5.C | 5.D | 5.E | 5.F |
|---|---|---|---|---|---|---|
| Starting bitumen (parts by weight) | 965 | 940 | 940 | 940 | 940 | 940 |
| Elastomer (parts by weight) | 35 | 60 | 60 | 60 | 60 | 60 |
| Sequence grafted onto the elastomer: | | | | | | |
| nature | | TGA | TGA | TGA | TPA | TPA |
| % of the elastomer | | 0.92 | 0.92 | 0.92 | 0.89 | 0.89 |
| Amine (parts by weight) | | | | 1.1 | | 0.64 |
| Dilution bitumen (parts by weight) | | | 774 | 774 | 774 | 774 |
| Pen. 25 (0.1 mm) | 68 | 50 | 61 | 48 | 60 | 45 |
| RBT (°C.) | 52 | 67 | 55.4 | 59 | 59 | 65 |
| PN | +0.06 | +3.3 | +0.57 | +0.73 | +1.30 | +1.71 |
| Tension at 20° C. | | | | | | |
| $\sigma_b$ (daN/cm$^2$) | 0 | | 0.8 | 1.1 | 1.0 | 1.3 |
| $\epsilon_b$ (%) | >700 | | >700 | >700 | >700 | >700 |
| Tension at 5° C. | | | | | | |
| $\sigma_b$ (daN/cm$^2$) | 4 | | 6 | 7.7 | 6.8 | 8.5 |
| $\epsilon_b$ (%) | 100 | | >700 | >700 | >700 | >700 |

TGA grafted sequence: —S—CH$_2$—COOH
TPA grafted sequence: —S—CH$_2$—CH$_2$—COOH Comparison of the results collated in the table leads to the following conclusions:

the replacement of the conventional elastomer of the control elastomer/bitumen composition (Test 5.A) by the same amount by weight of an elastomer functionalized, according to the invention, with —S—CH$_2$—COOH sequences (Test 5.C) or with —S—CH$_2$—CH$_2$—COOH sequences (Test 5.E) improves, by a crosslinking effect, the consistency (higher RBT values), the temperature susceptibility (increase in Pfeiffer's number) and the elastomericity (greater tensile elongation and higher stress at maximum elongation) of the elastomer/bitumen composition;

the addition of a reactive additive, such as, for example, a polyamine (Tests 5.D and 5.F), to the functionalized elastomer/bitumen compositions according to the invention further reinforces, by an ionomeric crosslinking effect, the consistency, the temperature susceptibility and the elastomericity of the said functionalized elastomer/bitumen compositions;

the functionalized elastomer/bitumen compositions for which the elastomer is functionalized by —S—CH$_2$—CH$_2$—COOH sequences have physicomechanical characteristics which are superior to those of the functionalized elastomer/bitumen compositions for which the elastomer is functionalized by —S—CH$_2$—COOH sequences, as results from the comparison of Tests 5.C and 5.E or of Tests 5.D and 5.F, demonstrating higher consistencies (RBT), temperature susceptibilities (Pfeiffer's number) and elastomericities (stresses at maximum elongation) for the functionalized elastomer/bitumen compositions of the first type;

functionalized elastomer/bitumen concentrated compositions which are not gelled and which do not separate out, even after prolonged storage at high temperature, can be obtained, for example concentrates containing 6% of functionalized elastomer (Test 5.B), the said concentrated compositions making it possible to produce, by dilution, functionalized elastomer/bitumen dilute compositions, for example containing 3.5% of functionalized elastomer, which behave very well.

We claim:

1. Functionalized elastomer of the containing a substrate elastomer, having a weight-average molecular weight $(\overline{Mw})_0$ of between 10,000 and 600,000 daltons and a polydispersity index of less than 5, onto which are grafted, in an amount representing 0.1 to 10% by weight of the substrate, sequences carrying carboxyl or ester functional groups, wherein its weight-average molecular mass $\overline{M}w$ is such that the ratio $$\frac{|\overline{M}w - (\overline{M}w)_o|}{(\overline{M}w)_o}$$

is less than 20% and in that the sequences grafted onto the substrate correspond to the formula $$-S-R_1-(COOX)_x,$$
$$\;\;\;\;\;|$$
$$\;\;\;\;(SH)_z$$

in which $R_1$ denotes an $(x+z+1)$-valent $C_1$ to $C_{12}$ hydrocarbon radical, X represents H or a monovalent $C_1$ to $C_{12}$ hydrocarbon radical R, z is equal to zero or 1 and x is an integer having a value ranging from 1 to 3 with $x+z \leq 3$.

2. Functionalized elastomer according to claim 1, wherein the said $$\frac{|\overline{M}w - (\overline{M}w)_o|}{(\overline{M}w)_o}$$

ratio is less than 12%.

3. Functionalized elastomer according to claim 1 wherein the number x, in the formula of the sequences $$-S-R_1-(COOX)_x,$$
$$\;\;\;\;\;|$$
$$\;\;\;\;(SH)_z$$

is equal to 1 or 2.

4. Functionalized elastomer according to claim 1 wherein the sequences grafted onto the elastomer substrate correspond to the formula $-S-R_3-(COOX)_x$, where $R_3$ is an $(x+1)$-valent $C_1$ to $C_{12}$ hydrocarbon radical.

5. Functionalized elastomer according to claim 1 wherein each of the radicals $R_1$, $R_3$ and R is a saturated, linear or branched, $C_1$ to $C_{12}$, aliphatic radical, an unsaturated, linear or branched, $C_2$ to $C_{12}$, aliphatic radical, a $C_4$ to $C_{12}$, cycloaliphatic radical or a $C_6$ to $C_{12}$, aromatic radical.

6. Functionalized elastomer according to claim 1 wherein the sequences grafted onto the substrate are selected from the group consisting of the sequences $-S-CH_2-COOH$, $-S-CH_2-CH_2-COOH$, $-S-CH_2-CH_2-CH_2-COOH$, $-S-CH_2-COOH$, $-S-CH_2-CH_2-COOH$, $-S-CH_2-CH_2-CH_2-COOH$, $-S-CH-COOH$,
$\;\;\;\;\;\;\;\;\;\;\;\;\;\;\;\;\;\;\;\;\;\;\;\;\;\;\;\;\;\;\;\;\;\;\;\;\;\;\;\;\;\;\;\;\;|$
$\;\;\;\;\;\;\;\;\;\;\;\;\;\;\;\;\;\;\;\;\;\;\;\;\;\;\;\;\;\;\;\;\;\;\;\;\;\;\;CH_2-COOH$ $-S-CH-COOH$ and 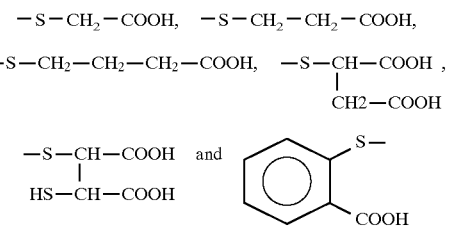
$\;\;\;|$
$HS-CH-COOH$ and the corresponding sequences for which the $-COOH$ group is replaced by an ester group $-COOR'$, where R' is a $C_1$ to $C_{12}$ alkyl radical.

7. Functionalized elastomer according to claim 1 wherein the substrate elastomer is chosen from random or block copolymers of styrene and of a conjugated diene.

8. Functionalized elastomer according to claim 7, wherein the substrate elastomer is composed of one or a number of copolymers chosen from block copolymers, with or without a random hinge, of styrene and of butadiene, of styrene and of isoprene, of styrene and of chloroprene, of styrene and of carboxylated butadiene and of styrene and of carboxylated isoprene, the said copolymers being diblock or triblock copolymers, with or without a random hinge.

9. Functionalized elastomer according to claim 7 the copolymer of styrene and of conjugated diene acting as substrate elastomer has a styrene content by weight ranging from 5% to 50%.

10. Functionalized elastomer according to claim 1 wherein the weight-average molecular weight $(\overline{M}w)_0$ of the substrate elastomer is between 30,000 and 400,000 daltons.

11. Functionalized elastomer according to claim 1 wherein the polydispersity index of the substrate elastomer is between 1 and 3.

12. Functionalized elastomer according to claim 1 which contains, by weight of the substrate elastomer, 0.1% to 6% of grafted sequences.

13. Functionalized elastomer according to claim 1 which is obtained by grafting technique which consists in bringing (i) the substrate elastomer into contact with (ii) a precursor of the sequences containing carboxyl or ester functionality, composed of at least one compound of formula $$(XOOC)_x-R_1-S-Y,$$
$$\;\;\;\;\;\;\;\;\;\;\;\;\;\;|$$
$$\;\;\;\;\;\;\;\;\;\;\;(SH)_z$$

in which Y denotes a hydrogen atom or a monovalent residue $$-S-R_1-(COOX)_x,$$
$$\;\;\;\;\;|$$
$$\;\;\;\;(SH)_z$$

until the functionalized elastomer has been formed, the amount of precursor representing 0.5% to 25% of the weight of the substrate elastomer, the said operation of bringing the elastomer into contact with the precursor being carried out in bulk or in a solvent and/or diluent medium, at temperatures of between 40° C. and 250° C. and in the presence of 0.1% to 1.5% by weight of the substrate elastomer, of a blocked phenol and of 0% to 2% by weight of the substrate elastomer, of a tri(dialkylphenyl) phosphite.

14. Functionalized elastomer according to claim 13, wherein the grafting reaction mixture contains both a blocked phenol and a tri(dialkylphenyl) phosphite.

15. Functionalized elastomer according to claim 14, wherein the amount by weight of triphosphite is equal to or greater than the amount by weight of blocked phenol.

16. Functionalized elastomer according to claim 13 wherein the blocked phenol is chosen from the compounds of formula:

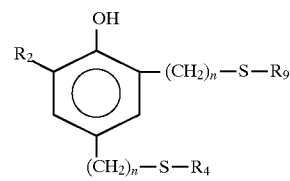

in which the symbols $R_2$, $R_9$ and $R_4$, which are identical or different, represent monovalent $C_1$ to $C_{18}$ aliphatic hydrocarbon radicals and n is a number from 0 to 5.

17. Functionalized elastomer according to claim 13 wherein the tri(dialkylphenyl) phosphite is chosen from the compounds of formula

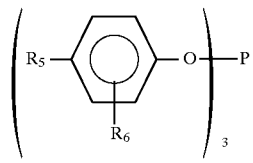

in which the symbols $R_5$ and $R_6$, which are identical or different, represent H or monovalent $C_1$ to $C_{18}$ aliphatic hydrocarbon radicals.

18. Functionalized elastomer according to claim 13 wherein a radical initiator which generates free radicals at the temperatures, between 40° C. and 250° C., chosen for the grafting is added to the grafting reaction mixture, which radical initiator is a peroxide compound and, for example, a dihydrocarbyl peroxide, the amount of radical initiator representing, in particular, 0.01% to 6% by weight of the substrate elastomer.

19. Functionalized elastomer according to the grafting is carried out in solvent and/or diluent medium or in bulk and at temperatures of between 40° C. and 150° C., the precursor compound of the carboxyl or ester sequences having the formula

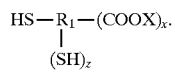

20. Functionalized elastomer according to claim 13 wherein the grafting is carried out in bulk and at temperatures of between 150° C. and 250° C., the precursor compound of the carboxyl or ester sequences having the formula

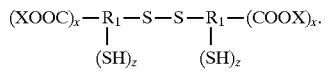

21. Application of the functionalized elastomer process for the production of functionalized elastomer/bitumen compositions with a wide plasticity range by incorporation, in a bituminous component, of an amount of the said functionalized elastomer of claim 1 representing 0.5% to 25% of the weight of the bituminous component.

22. Process according to claim 21, wherein the bituminous component is composed of one or a number of bitumens which have a kinematic viscosity at 100° C. of between $0.5 \times 10^{-4}$ m²/s and $3 \times 10^{-2}$ m²/s.

23. Process according to claim 22, wherein the bituminous component has a penetrability at 25° C., defined according to NF Standard T 66004, of between 5 and 800.

24. Process according to claim 22 wherein the incorporation of the functionalized elastomer in the bituminous component is carried out by kneading the ingredients, the operation being carried out at temperatures of between 100° C. and 230° C. for a period of time of 30 minutes to 8 hours, in order to form a homogeneous mixture constituting the functionalized elastomer/bitumen composition.

25. Process according to claim 24, wherein the said homogeneous mixture has added to it, the operation being carried out with stirring at temperatures of between 100° C. and 230° C., one or a number of additives capable of reacting with the carboxyl or ester functional groups carried by the functionalized elastomer, the said additives being primary or secondary amines, alcohols, epoxides or alternatively metal compounds, in particular compounds of metals from groups I, II, III and VIII of the Periodic Table of the Elements.

26. Process according to claim 25, characterized in that the amount of the reactive additive or of the reactive additives which is incorporated in the functionalized elastomer/bitumen composition represents 0.01% to 10% and more particularly 0.05% to 5% of the weight of the bituminous component present in the said composition.

27. Process according to one of claims 21 to 26, characterized in that the functionalized elastomer/bitumen composition has added to it, during production or after having been produced, 1% to 40% and more especially 2% to 30%, by weight of the bituminous component, of a fluxing agent, the operation being carried out with stirring at temperatures of between 100° C. and 230° C. and more particularly between 120° C. and 190° C., the said fluxing agent being, in particular, a hydrocarbon oil which has an atmospheric pressure distillation range, determined according to ASTM Standard D 86-67, of between 100° C. and 600° C. and preferably between 150° C. and 400° C.

28. Process according to claim 27, characterized in that the fluxing agent is composed of the said hydrocarbon oil and in that the functionalized elastomer is incorporated in the bituminous component in the form of a mother solution in the hydrocarbon oil constituting the fluxing agent, the amount of functionalized elastomer advantageously representing 5% to 40% and more particularly 10% to 30% of the weight of the hydrocarbon oil.

29. Process according to claim 21 wherein the functionalized elastomer/bitumen composition is employed, as it is or after dilution with a bituminous component or else with another functionalized elastomer/bitumen composition according to claim 21 which has different characteristics, as functionalized elastomer/bitumen binder which is suitable directly or after conversion into aqueous emulsion, for the production of road surfacings, for the production of bituminous mixes which are put in place with heating or cold, or else for the production of watertight facings.

* * * * *

UNITED STATES PATENT AND TRADEMARK OFFICE
CERTIFICATE OF CORRECTION

PATENT NO. : 5,804,619
DATED : September 8, 1998
INVENTOR(S) : Pascal Nicol, et al It is certified that error appears in the above-indentified patent and that said Letters Patent is hereby corrected as shown below:

Column 3, line 33: the two occurrences of "mass" should read --weight--;
Column 4, line 54: "tri(dialklylphenyl" should read --tri(dialklylphenyl--;
Column 9, lines 57 and 66: "Theological" should read --rheological--;
Column 10, line 40: place a "parenthesis" before "product";
Column 13, line 54: "Theological" should read --rheological--;
Column 14, line 65: delete "of the";
Column 15, lines 46-48: delete the formulae written at these lines of Claim 6 as they also appear at lines 50-51;

Claim 19, first line: after "according to" insert --claim 13 wherein--;
Claim 21, first line: cancel "Application of the functionalized elastomer";
Claim 26, first line: change "characterized in that" to --wherein--;
Claim 27, two first lines: change "characterized in that" to --wherein--;
Claim 28, first line: change "characterized in that" to --wherein--.

Signed and Sealed this

Fourth Day of May, 1999

Attest:

Attesting Officer

Q. TODD DICKINSON

Acting Commissioner of Patents and Trademarks

UNITED STATES PATENT AND TRADEMARK OFFICE
CERTIFICATE OF CORRECTION

PATENT NO. : 5,804,619
DATED : Sep. 8, 1998
INVENTOR(S) : Pascal Nicol, et al

It is certified that error appears in the above-identified patent and that said Letters Patent is hereby corrected as shown below:

On title page, item [73], Assignee should read –Elf Aquitaine--

Signed and Sealed this

Fifth Day of October, 1999

Attest:

Q. TODD DICKINSON

*Attesting Officer*     *Acting Commissioner of Patents and Trademarks*